US012662597B2

(12) United States Patent
Hwang et al.

(10) Patent No.: US 12,662,597 B2
(45) Date of Patent: Jun. 23, 2026

(54) SYSTEM AND METHOD FOR PREPARING CARBON BLACK FROM WASTE TIRES BY USING PYROLYSIS

(71) Applicant: LD Carbon CO., LTD., Dangjin-si (KR)

(72) Inventors: Young Kyung Hwang, Seoul (KR); Seong Mun Baek, Gimcheon-si (CN)

(73) Assignee: LD CARBON CO., LTD., Dangjin-si (KR)

( * ) Notice: Subject to any disclaimer, the term of this patent is extended or adjusted under 35 U.S.C. 154(b) by 0 days.

(21) Appl. No.: 19/263,851

(22) Filed: Jul. 9, 2025

(65) Prior Publication Data

US 2025/0333604 A1      Oct. 30, 2025

Related U.S. Application Data

(63) Continuation of application No. PCT/KR2023/019255, filed on Nov. 27, 2023.

(30) Foreign Application Priority Data

Jan. 10, 2023      (KR) ........................ 10-2023-0003697

(51) Int. Cl.
*C09C 1/60*            (2006.01)

(52) U.S. Cl.
CPC ............ *C09C 1/60* (2013.01); *C01P 2004/61* (2013.01)

(58) Field of Classification Search
CPC ......... C09C 1/60; C09C 1/48; C01P 2004/61; C10B 53/07; C10G 1/00; C10G 1/10; C10K 1/00
See application file for complete search history.

(56) References Cited

U.S. PATENT DOCUMENTS 4,211,578 A * 7/1980 Scott, IV ................. C09C 1/48
                                                        264/117
5,728,361 A * 3/1998 Holley ................... C10B 53/07
                                                        423/449.6

FOREIGN PATENT DOCUMENTS

KR        100309880 B1    12/2001
KR     20060078313 A      7/2006
(Continued)

OTHER PUBLICATIONS

Iijima, et al., Effect of structure of cationic dispersands on stability of carbon black nanoparticles and further processability through layer-by-layer surface modification, Chemical Engineering Science 2013; 85: 30-37 (Year: 2013).*

(Continued)

*Primary Examiner* — Daniel C. Mccracken
(74) *Attorney, Agent, or Firm* — Scully, Scott, Murphy & Presser, P.C.

(57)            ABSTRACT

A method for preparing carbon black according to the present invention comprises the steps of: pyrolyzing by heating waste tires; separating char in the pyrolyzed material from an iron-containing foreign substance; pulverizing the char into fine particles or fine powder to form carbon black; pelletizing the carbon black; cooling and drying the pelletized carbon black; and packaging the pelletized carbon black, wherein the pyrolyzing step comprises: a primary pyrolysis step of heating waste tires; and a secondary pyrolysis step of heating char and iron in the primary pyrolyzed material, and the heating temperature of the secondary pyrolysis step is higher than the heating temperature of the primary pyrolysis step.

13 Claims, 1 Drawing Sheet

(56)  References Cited

FOREIGN PATENT DOCUMENTS

| KR | 20180067753 A | 6/2018 |
| KR | 20180135808 A | 12/2018 |
| KR | 20190084713 A | 7/2019 |

OTHER PUBLICATIONS

Banar, Life Cycle Assessment of Waste Tire Pyrolysis, Fresenius Environmental Bulletin 2015; 24(4): 1215-1226 (Year: 2015).*
Torrente Murciano, et al., Sour compression process for the removal of Sox and NOx from oxyfuel-derived CO2, Energy Procedia 2011; 4: 908-916 (Year: 2011).*
International Search Report dated Mar. 5, 2024 issued in PCT/KR2023/019255.

* cited by examiner

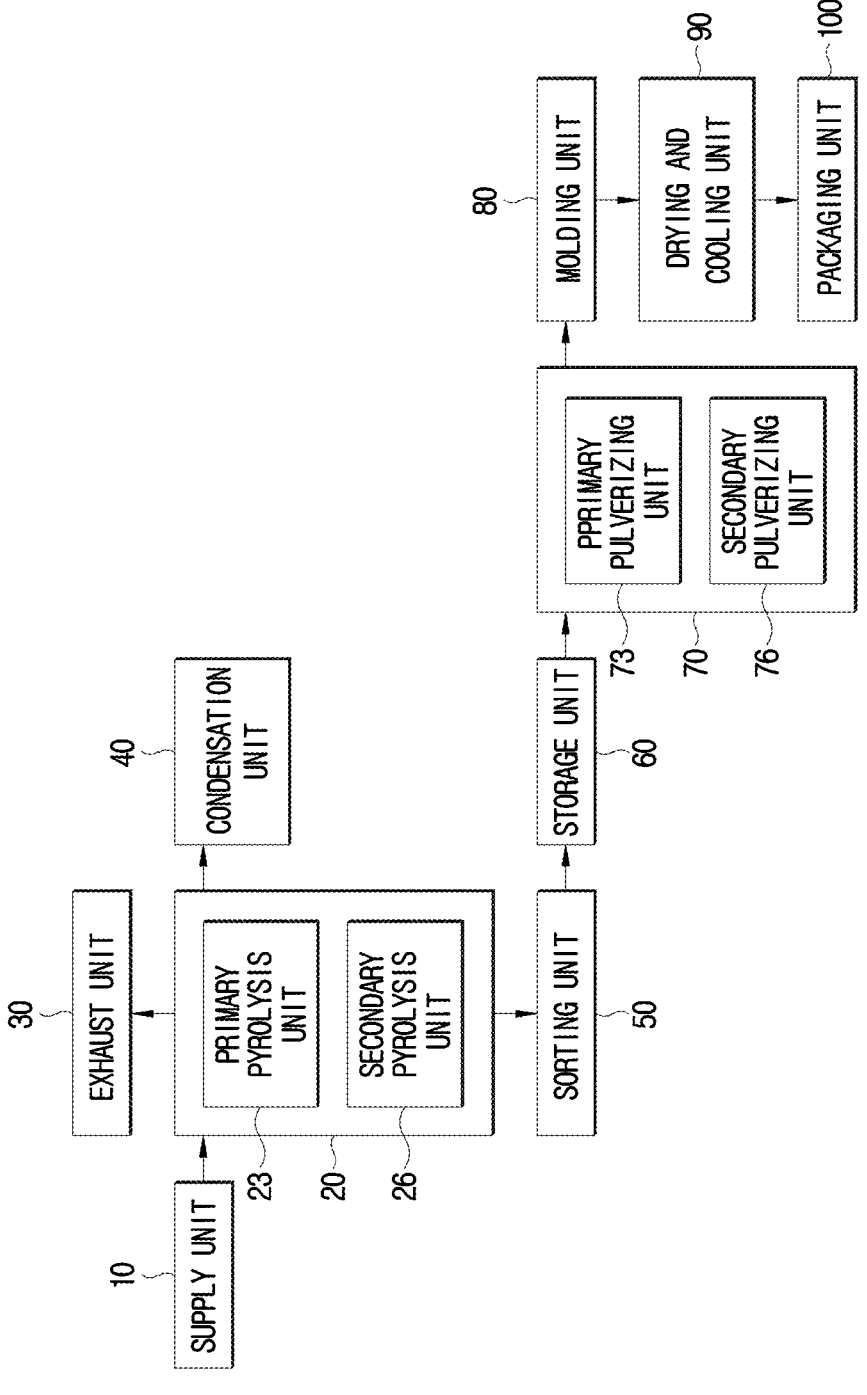

SYSTEM AND METHOD FOR PREPARING CARBON BLACK FROM WASTE TIRES BY USING PYROLYSIS

TECHNICAL FIELD

The present invention relates to a system and method for preparing carbon black from waste tires for obtaining carbon black of better performance.

BACKGROUND ART

A large amount of organic polymer waste, such as waste tires and waste plastics, is generated as waste domestically and abroad. In particular, approximately 1.5 billion waste tires are generated annually worldwide, corresponding to approximately 15 million tons by weight. In case of South Korea, approximately 380 thousand tons of waste tires were generated in 2021. The treatment of these wastes is classified into landfilling, incineration, and recycling, and landfilling has a problem in that suitable landfill sites need to be continuously developed due to the property that waste tires and waste plastics do not decompose easily, and the share of landfilling is decreasing among waste treatment methods as the issue of soil pollution is becoming more important. On the other hand, incineration has an advantage in that it may minimize the volume in a short time and use the heat generated during incineration. However, as the emission of air pollutants such as dioxins generated during incineration becomes problematic, the development of alternative technologies is being demanded.

Therefore, recycling of waste tires is expected as another alternative that may reduce the amount of waste generated and solve the environmental pollution problems that may occur due to landfilling or incineration.

Among the recycling methods of waste tires, the most commonly used pyrolysis method refers to a method of thermally decomposing organic waste at a temperature of 500 to 800° C. in an oxygen-free state.

In this regard, Korean Patent Publication No. 10-2019-0084713 discloses refining of char through pyrolysis of waste tires and a system and method for preparing carbon black. However, the above patent does not specifically disclose detailed parameters or methods of such pyrolysis.

SUMMARY

The present invention is directed to providing a system and method for preparing carbon black for obtaining carbon black of quality superior to that of existing products.

Technical Solution

There is provided a method of preparing carbon black, according to the present invention. The method may include: performing pyrolysis by heating waste tires; separating char among the pyrolyzed substances from an iron-containing foreign substance; pulverizing the char into a form of fine particles or fine powder to form carbon black; pelletizing the carbon black; cooling and drying the pelletized carbon black; and packaging the pelletized carbon black, in which the performing of the pyrolysis may include: a primary pyrolysis step of heating the waste tires; and a secondary pyrolysis step of heating char and iron among the substances that have undergone the primary pyrolysis step, and a heating temperature of the secondary pyrolysis step may be higher than a heating temperature of the primary pyrolysis step.

In an embodiment, in the primary pyrolysis step, the waste tires may be heated to 300 to 450° C., and in the secondary pyrolysis step, the char and iron may be heated to 550 to 700° C.

In an embodiment, the pulverizing of the char into a form of fine powder to form carbon black may include: a primary pulverizing step; and a secondary pulverizing step.

In an embodiment, in the primary pulverizing step, the char may be pulverized through any one of a ring roller mill, an air classifier mill (ACM), or a raymond mill, and in the secondary pulverizing step, the char may be pulverized through a ring roller mill or an ACM.

In an embodiment, in the primary pulverizing step, the char may be pulverized to a particle size of 80 μm or less, and in the secondary pulverizing step, the char may be pulverized to a particle size of 10 μm or less.

There is provided a system for preparing carbon black, according to the present invention. The system may include: a feeding unit which is a portion into which waste tires are introduced; a pyrolysis unit configured to perform pyrolysis on the waste tires supplied from the feeding unit, wherein in the pyrolysis unit, the waste tires are pyrolyzed into gas, oil, char, and iron; an exhaust unit to which flue gas generated by combustion in the pyrolysis unit is sent, the exhaust unit including a compression portion configured to compress the transferred gas, a denitrification portion configured to remove nitrogen, and a desulfurization portion configured to remove sulfur from the gas; a condensation unit to which oil vapor decomposed in the pyrolysis unit is sent, the condensation unit being positioned horizontally with the pyrolysis unit and in proximity thereto, and the condensation unit condensing the oil vapor to generate oil, and transferring non-condensable gas that has not been condensed to the pyrolysis unit to be used for combustion; a sorting unit to which char decomposed in the pyrolysis unit is sent, wherein in the sorting unit, the char is separated from an iron-containing foreign substance; a storage unit in which the char sent from the sorting unit is stored; a pulverizing unit to which the char from the storage unit is sent, the pulverizing unit pulverizing the char into a form of fine particles or fine powder to form carbon black; a pelletizing unit to which the carbon black from the pulverizing unit is sent, the pelletizing unit including a pelletizer that pelletizes the carbon black; a cooling and drying unit to which the pelletized carbon black is sent from the pelletizing unit to be dried and cooled; and a packaging unit configured to package the pelletized carbon black sent from the cooling and drying unit, in which the pyrolysis unit may include: a primary pyrolysis unit configured to heat the waste tires; and a secondary pyrolysis unit configured to heat char and iron among substances subjected to the primary pyrolysis, and a heating temperature of the secondary pyrolysis unit may be higher than a heating temperature of the primary pyrolysis unit.

In an embodiment, in the primary pyrolysis unit, the waste tires may be heated to 300 to 450° C., and in the secondary pyrolysis unit, the char and iron may be heated to 550 to 700° C.

In an embodiment, the pulverizing unit may include: a primary pulverizing unit; and a secondary pulverizing unit.

In an embodiment, in the primary pulverizing unit, the char may be pulverized through any one of a ring roller mill, an air classifier mill (ACM), or a raymond mill, and in the secondary pulverizing unit, the char may be pulverized through a ring roller mill or an ACM.

In an embodiment, in the primary pulverizing unit, the char may be pulverized to a particle size of 80 μm or less, and in the secondary pulverizing unit, the char may be pulverized to a particle size of 10 μm or less.

Advantageous Effects

The system and method for preparing carbon black according to the present invention may obtain carbon black of excellent quality because pyrolysis is performed in a divided manner into a primary stage at 300 to 450 degrees and a secondary stage at 550 to 700 degrees, and may improve operating efficiency due to continuous operation being possible.

The system and method for preparing carbon black according to the present invention may obtain carbon black having small particle size, excellent quality, and low preparing cost by pulverizing char, during pulverizing, by dividing it into two stages, without using a jet mill.

DESCRIPTION OF DRAWING

The FIGURE is a view illustrating a system for preparing carbon black through pyrolysis of waste tires according to the present invention.

DETAILED DESCRIPTION OF EMBODIMENTS

Hereinafter, embodiments of the present invention will be described in detail with reference to the accompanying drawings so that those with ordinary skill in the art to which the present invention pertains may easily carry out the embodiments. However, the present invention may be implemented in various different ways and is not limited to the embodiments described herein.

The FIGURES is a view illustrating a system for preparing carbon black through pyrolysis of waste tires according to the present invention. With reference to the FIGURE, a system for preparing carbon black through pyrolysis of waste tires according to the present invention may include a feeding unit 10, a pyrolysis unit 20, an exhaust unit 30, a condensation unit 40, a sorting unit 50, a storage unit 60, a pulverizing unit 70, a pelletizing unit 80, a drying and cooling unit 90, and a packaging unit 100.

The feeding unit 10 may be a portion into which waste tires are introduced. The feeding unit 10 may transfer the introduced waste tires through a drag conveyor inside the feeding unit 10 and store them in a storage silo. The waste tires stored in the storage silo may be discharged through a discharge conveyor belt and may head to the pyrolysis unit 20.

The pyrolysis unit 20 may be a portion that performs pyrolysis on the waste tires supplied from the feeding unit 10. The pyrolysis unit 20 may be configured to include a primary pyrolysis unit 23 and a secondary pyrolysis unit 26. The primary pyrolysis unit 23 may heat the waste tires to a high temperature, for example, 300 to 450° C., by introducing high-temperature gas generated from a hot air furnace into the inside of a reactor. The reactor may operate in an oxygen-free atmosphere or a low-oxygen atmosphere in a sealed state with the outside, and nitrogen may be supplied to one end of the reactor to maintain this. The heated waste tires may be decomposed into gas, oil, char, and iron, etc.

In the primary pyrolysis unit 23, since heating is performed at a lower temperature than that of a conventional pyrolysis process, the ratio of gas may be lower and the ratio of oil may be higher than in the conventional pyrolysis process. For example, in case where pyrolysis is performed at a temperature exceeding 500° C. at once in the conventional process, if it includes 15 wt % of gas, 40 wt % of oil, 35 wt % of char, and 10 wt % of iron, the pyrolysis process according to the present invention may include 10 wt % of gas, 45 wt % of oil, 35 wt % of char, and 10 wt % of iron. That is, the pyrolysis process according to the present invention may have a higher ratio of oil and a lower ratio of gas than the conventional pyrolysis process. Therefore, maintenance and management of the process may be easy, and operating efficiency may be improved due to continuity of operation of the process.

The flue gas generated by combustion in the primary pyrolysis unit 23 may be sent to the exhaust unit 30. The exhaust unit 30 may include a compression portion for compressing the transferred gas, a denitrification portion for removing nitrogen from the gas, and a desulfurization portion for removing sulfur from the gas. The exhaust gas discharged through such a portion may be safer from air pollution.

The oil vapor decomposed in the primary pyrolysis unit 23 may be sent to the condensation unit 40. The condensation unit 40 may be positioned horizontally with the primary pyrolysis unit 23, and may be positioned in proximity to the primary pyrolysis unit 23. The condensation unit 40 may condense the oil vapor, transfer the oil generated by condensation through an oil pump, and store it in an oil storage tank. Non-condensable gas that has not been condensed may be transferred and stored in a gas tank through a transfer fan. Thereafter, the non-condensable gas may be transferred to a hot air furnace of the primary pyrolysis unit 23 and may be used for combustion. Therefore, due to the recycling of such non-condensable gas, the process cost is reduced, and the process may be environmentally friendly.

The char and iron decomposed in the primary pyrolysis unit 23 may be sent to the secondary pyrolysis unit 26 through one or more conveyors. The secondary pyrolysis unit 26 may be a portion that performs pyrolysis on the supplied char and iron. The secondary pyrolysis unit 26 may heat the char and iron to a high temperature, for example, 550 to 700° C., by introducing high-temperature gas generated from a hot air furnace into the inside of a reactor. That is, the heating temperature in the secondary pyrolysis unit 26 may be higher than the heating temperature in the primary pyrolysis unit 23. The reactor may operate in an oxygen-free atmosphere or a low-oxygen atmosphere in a sealed state with the outside, and nitrogen may be supplied to one end of the reactor to maintain this. The heated char and iron may be decomposed again into gas, oil, char, and iron, etc., as in the primary pyrolysis unit 23. The gas and oil decomposed in this manner may be sent to the exhaust unit 30 and the condensation unit 40, like the decomposition products of the primary pyrolysis unit 23.

The pyrolysis process according to the present invention may perform not only a primary pyrolysis process, but also a secondary pyrolysis process at a higher temperature. Accordingly, the oil content on the surface of carbon black is lower than the oil content on the surface of conventional carbon black, so the quality of carbon black is excellent, and a smaller amount of polycyclic aromatic hydrocarbons (PAH), which indicate carcinogenicity, is included as a result.

As a result, the pyrolysis process according to the present invention achieves the effect of simultaneously obtaining char having low surface oil content and low PAH, and achieving a process that is easy to maintain and manage, in which the ratio of gas generated in the process is low and the ratio of oil is high.

The char and iron decomposed in the secondary pyrolysis unit 26 may be sent to the sorting unit 50 through one or more conveyors. The sorting unit 50 may be a portion that separates iron-containing foreign substance from char. For example, the sorting unit 50 may include a primary sorter that separates foreign substance by vibrating the char, and a secondary sorter that separates iron from the char transferred from the primary sorter using magnetic force.

The char may be sent from the sorting unit 50 to the storage unit 60 through one or more conveyors. The storage unit 60 may be a portion where char is stored. In this embodiment, it is given as an example that the storage unit 60 includes a silo, but the present invention is not limited thereto.

The char may be sent from the storage unit 60 to the pulverizing unit 70. The pulverizing unit 70 may pulverize the transferred char into a form of fine particles or fine powder to form carbon black. The pulverizing unit 70 may be configured to include a primary pulverizing unit 73 and a secondary pulverizing unit 76. In the pulverizing unit 70, the char may be pulverized through a primary pulverizing process in the primary pulverizing unit 73 and a secondary pulverizing process in the secondary pulverizing unit 76. In the primary pulverizing process, the char having no distribution of particle size may be pulverized to a particle size of 80 μm or less through any one of a ring roller mill, an air classifier mill (ACM), or a raymond mill. In the secondary pulverizing process, the char having a particle size of 80 μm or less may be pulverized to a particle size of 10 μm or less through a ring roller mill or ACM to form carbon black. In an embodiment, in the primary pulverizing process, the char having no distribution of particle size may be pulverized to a particle size of 80 μm or less through a ring roller mill, and in the secondary pulverizing process, the char having a particle size of 80 μm or less may be pulverized to a particle size of 10 μm or less through ACM to form carbon black.

In a conventional pulverizing process, carbon black having a particle size of 80 μm or less was formed by using a ring roller mill only once, but the particle size is much larger than that of the carbon black formed using the system and method of the present invention, so there is a problem in that the quality of carbon black is poor.

In addition, in the conventional pulverizing process, there is a case where a jet mill is used to form carbon black having a particle size of 10 μm or less, but this has a problem in that the jet mill itself occupies a very large space, requires high equipment cost, and consumes a lot of electric power.

The system and method according to the present invention has an effect of being able to prepare carbon black having a particle size of 10 μm or less and excellent quality without using a jet mill that occupies much space and incurs high cost.

The formed carbon black may be transferred from the pulverizing unit 70 to the pelletizing unit 80. In the pelletizing unit 80, the carbon black may be molded into a spherical shape using water as a binder.

The pelletizing unit 80 may include a pelletizer that pelletizes the carbon black. In the pelletizer of the pelletizing unit 80, not only the carbon black but also other materials may be included so that the carbon black may be agglomerated well into a spherical shape.

A composition for pelletizing conventional carbon black may include carbon black of 95 wt % or more and ash and inorganic additives of less than 5 wt %. In this case, since carbon black may not agglomerate well with only the composition and water, pelletization may not be easy. Therefore, the composition for pelletizing conventional carbon black has a problem in that other materials such as starch need necessarily to be included during pelletizing in order to perform pelletization.

In contrast, a composition for pelletizing carbon black according to the present invention may include carbon black of 75 to 85 wt % and ash and inorganic additives of 15 to 25 wt %. For example, the inorganic additive may include zinc oxide (ZnO), magnesium oxide (MgO), silica (SiO₂), zinc sulfide (ZnS), calcium carbonate (CaCO₃), and the like. The composition for pelletizing carbon black according to the present invention may include significantly more ash and inorganic additives compared to the composition for pelletizing conventional carbon black. Therefore, it may agglomerate much better than the composition for pelletizing conventional carbon black.

Meanwhile, the composition for pelletizing carbon black according to the present invention may agglomerate well even when mixed only with water, without any other additive such as starch. Rather, even when mixed only with water, the composition for pelletizing carbon black according to the present invention may exhibit a pellet hardness of 80 to 100. In this case, there is an advantage in that the pelletized carbon black does not break during storage and transport. However, there is a disadvantage in that the pelletized carbon black cannot be easily broken by the customer for use of carbon black.

Therefore, a cationic surfactant may be added together with water during pelletizing in the composition for pelletizing carbon black according to the present invention. The cationic surfactant may serve to prevent agglomeration of the carbon black. The cationic surfactant may include amido imidazolinium, stearyl amine acetate, lauryl trimethyl ammonium chloride, diamido alkoxylate quaternary ammonium, diester alkoxylate quaternary ammonium, and the like. The amount of water added may be 40 to 50 parts by weight based on 100 parts by weight of carbon black, and the amount of cationic surfactant added may be 0.1 to 1 part by weight based on 100 parts by weight of carbon black. Even if such a small amount of cationic surfactant is added in this way, the pellet hardness may be sufficiently reduced to 20 to 50.

The composition for pelletizing carbon black according to the present invention may agglomerate well due to the amount of inorganic additive, while becoming less agglomerated as the cationic surfactant is added during pelletizing. Therefore, the pelletized carbon black may not break well during storage and transport, and may have an advantage in that it is easily broken by a mixer when used by the customer.

The pelletized carbon black in the pelletizing unit 80 may be sent to the drying and cooling unit 90 through a conveyor belt to be dried and cooled. For example, the pelletized carbon black may first be dried by heat in a dryer of the drying and cooling unit 90, and then may be cooled in a cooler. The pelletized carbon black may have the water added to the carbon black composition removed when it is dried in a dryer. For example, 40 to 50 parts by weight of water added based on 100 parts by weight of carbon black may be dried so that less than 1 part by weight remains.

The carbon black may be sent from the drying and cooling unit 90 to the packaging unit 100 through a conveyor belt. The packaging unit may package the pelletized carbon black in preset quantities as units. For example, the packaging unit 100 may include a tonbag packaging unit and a small packaging unit. The carbon black from the drying and cooling unit 90 may be connected to a two way damper of the packaging unit 100, and through the two way damper, the carbon black may be selectively transferred to the tonbag packaging unit or the small packaging unit.

According to the above-described configuration, a task in which carbon black is prepared through a pyrolysis process of waste tires proceeds in a continuous and sequential working manner through a series of processes that follow an optimal sequence, and as a result, the quality of the pelletized carbon black may be in a very excellent state.

While the technical spirit of the present invention has been described above together with the accompanying drawings, this is merely an illustrative description of preferred embodiments of the present invention, and is not intended to limit the present invention. In addition, it is obvious that various modifications and imitations can be made by those skilled in the art without departing from the scope of the technical spirit of the present invention.

The invention claimed is:

1. A method of preparing carbon black, comprising:
    performing a primary pyrolysis step of heating waste tires to produce first pyrolyzed substances comprising char and iron at a first pyrolysis unit;
    transferring the first pyrolyzed substances from the first pyrolysis unit to a second pyrolysis unit;
    performing a secondary pyrolysis step of heating the char and the iron of the first pyrolyzed substances to produce second pyrolyzed substances, at the second pyrolysis unit;
    separating the char from the second pyrolyzed substances;
    pulverizing the separated char through any one of a ring roller mill, an air classifier mill (ACM), or a raymond mill to a particle size of 80 $\mu$m or less;
    pulverizing the separated char a second time through a ring roller mill or an ACM to a particle size of 10 $\mu$m or less to form carbon black;
    pelletizing the carbon black, wherein in the pelletizing, a composition for pelletizing includes carbon black of 75 to 85 wt % and ash and inorganic additives of 15 to 25 wt %;
    cooling and drying the pelletized carbon black; and
    packaging the pelletized carbon black,
        wherein a heating temperature of the secondary pyrolysis step is higher than a heating temperature of the primary pyrolysis step.

2. The method of claim 1, wherein in the primary pyrolysis step, the waste tires are heated to over 360° C., and in the secondary pyrolysis step, the char and iron are heated to over 650° C.

3. The method of claim 2, wherein the separating of the char from the second pyrolyzed substances comprises:
    a primary sorting step; and
    a secondary sorting step.

4. The method of claim 3, wherein in the primary sorting step, the char is vibrated to separate foreign substances from the second pyrolyzed substances, and in the secondary sorting step, the iron is separated from the char using magnetic force.

5. The method of claim 1, wherein the inorganic additive includes at least one of zinc oxide (ZnO), magnesium oxide (MgO), silica ($SiO_2$), zinc sulfide (ZnS), or calcium carbonate ($CaCO_3$).

6. The method of claim 5, wherein the pelletizing is performed by adding water and a cationic surfactant to the composition.

7. A method of preparing carbon black, comprising:
    performing a primary pyrolysis step of heating waste tires to produce first pyrolyzed substances comprising char and iron at a first pyrolysis unit;
    recovering oil by condensing oil vapor generated in the primary pyrolysis, and reusing non-condensable gas that has not been condensed as a heat source for the primary pyrolysis;
    transferring the first pyrolyzed substances from the first pyrolysis unit to a second pyrolysis unit;
    performing a secondary pyrolysis step of heating the char and the iron of the first pyrolyzed substances to produce second pyrolyzed substances, at the second pyrolysis unit;
    ;
    separating the char from the second pyrolyzed substances;
    pulverizing the separated char through any one of a ring roller mill, an air classifier mill (ACM), or a raymond mill to a particle size of 80 $\mu$m or less;
    pulverizing the separated char a second time through a ring roller mill or an ACM to a particle size of 10 $\mu$m or less to form carbon black;
    pelletizing the carbon black, wherein in the pelletizing, a composition for pelletizing includes carbon black of 75 to 85 wt % and ash and inorganic additives of 15 to 25 wt %
    cooling and drying the pelletized carbon black;
    cooling and drying the pelletized carbon black; and
    packaging the pelletized carbon black.

8. The method of claim 7, further comprising:
    processing flue gas generated in the primary pyrolysis.

9. The method of claim 8, wherein the processing of the flue gas comprises:
    a compression step of compressing the gas;
    a denitrification step of removing nitrogen from the gas; and
    a desulfurization step of removing sulfur from the gas.

10. The method of claim 1, wherein the non-condensable gas is transferred to and stored in a gas tank through transfer fan.

11. The method of claim 10, wherein the non-condensable gas stored in the gas tank is transferred to a hot air furnace of the primary pyrolysis and reused as a heat source for the primary pyrolysis.

12. The method of claim 1, wherein the first pyrolyzed substances includes at most 15 wt % gas and at least 40 wt % oil.

13. The method claim 10, wherein the water added may be 40 to 50 parts by weight based on 100 parts by weight of carbon black, and the amount of cationic surfactant added may be 0.1 to 1 part by weight based on 100 parts by weight of carbon black.

* * * * *